United States Patent
Abitboul et al.

(10) Patent No.: US 12,524,534 B1
(45) Date of Patent: Jan. 13, 2026

(54) TECHNIQUES FOR ASSESSING EXPLOITATIONS IN A RUNTIME ENVIRONMENT

(71) Applicant: R.C.Raven Cloud LTD, Tel Aviv-Jaffa (IL)

(72) Inventors: Roi Abitboul, Mountain View, CA (US); Guy Franco, Tel Aviv (IL); Leonid Frenkel, Kibbutz Gat (IL); Omer Yair, Ramat Gan (IL)

(73) Assignee: R.C.Raven Cloud LTD, Tel Aviv-Jaffa (IL)

( * ) Notice: Subject to any disclaimer, the term of this patent is extended or adjusted under 35 U.S.C. 154(b) by 0 days.

(21) Appl. No.: 19/182,219

(22) Filed: Apr. 17, 2025

(51) Int. Cl.
  *G06F 21/55* (2013.01)
  *G06F 21/57* (2013.01)

(52) U.S. Cl.
  CPC .......... *G06F 21/554* (2013.01); *G06F 21/577* (2013.01); *G06F 2221/034* (2013.01)

(58) Field of Classification Search
  None
  See application file for complete search history.

(56) References Cited

U.S. PATENT DOCUMENTS

| | | | |
|---|---|---|---|
| 7,849,509 B2 | 12/2010 | Venkatapathy et al. | |
| 8,640,064 B1 * | 1/2014 | Liddell | G06F 30/33 716/106 |
| 8,844,033 B2 * | 9/2014 | Song | H04L 67/02 726/25 |
| 9,535,855 B2 * | 1/2017 | Epstein | G06F 9/44563 |
| 9,892,261 B2 | 2/2018 | Joram et al. | |
| 10,372,909 B2 | 8/2019 | Wray et al. | |
| 10,579,803 B1 | 3/2020 | Mueller et al. | |
| 11,042,647 B1 | 6/2021 | Joyce et al. | |
| 11,997,131 B1 | 5/2024 | Sirianni et al. | |
| 12,141,297 B1 * | 11/2024 | Seri | G06F 21/577 |
| 2005/0132206 A1 * | 6/2005 | Palliyil | G06F 21/566 713/188 |
| 2008/0313656 A1 * | 12/2008 | Klein | G06F 9/544 719/320 |
| 2009/0204978 A1 * | 8/2009 | Lee | G06F 9/4812 719/321 |
| 2011/0173693 A1 * | 7/2011 | Wysopal | G06F 21/577 726/19 |

(Continued)

FOREIGN PATENT DOCUMENTS

| | | |
|---|---|---|
| CN | 113434870 B | 7/2022 |
| EP | 3899770 A1 | 10/2021 |

*Primary Examiner* — Kaveh Abrishamkar
(74) *Attorney, Agent, or Firm* — M&B IP Analysts LLC (57) ABSTRACT

A system and method for efficiently detecting an exploitation during a workload runtime is presented. The method includes fetching a library call chain that has at least a first library, wherein the library call chain is a series of software libraries that are employed in executing the workload at the runtime, wherein the library call chain is fetched based on a trigger of an event at the workload runtime; determining a hash value for the fetched library call chain, wherein the hash value is a numerical representation of the library call chain that has at least the first library; checking the determined hash value against a policy for a match; detecting an exploit in the library call chain upon determining a mismatch between the determined hash value and the policy; and causing an execution of a mitigation action.

19 Claims, 6 Drawing Sheets

(56) References Cited

U.S. PATENT DOCUMENTS

| | | | |
|---|---|---|---|
| 2011/0185433 A1* | 7/2011 | Amarasinghe | G06F 21/577 |
| | | | 726/25 |
| 2013/0160128 A1* | 6/2013 | Dolan-Gavitt | G06F 21/552 |
| | | | 726/25 |
| 2015/0100940 A1 | 4/2015 | Mockus et al. | |
| 2017/0098072 A1* | 4/2017 | Stopel | G06F 21/51 |
| 2017/0372068 A1 | 12/2017 | Zimmerman | |
| 2019/0180036 A1* | 6/2019 | Shukla | G06F 9/542 |
| 2020/0167476 A1 | 5/2020 | Boulton | |
| 2021/0097174 A1* | 4/2021 | Mandal | G06F 21/554 |
| 2022/0345480 A1* | 10/2022 | Shua | G06F 21/577 |
| 2023/0018585 A1* | 1/2023 | Liljestrand | G06F 21/54 |
| 2023/0385403 A1 | 11/2023 | Czerninski et al. | |

\* cited by examiner

FIG. 6

TECHNIQUES FOR ASSESSING EXPLOITATIONS IN A RUNTIME ENVIRONMENT

TECHNICAL FIELD

The present disclosure relates generally to cloud computing and, in particular, to systems and methods for detecting vulnerabilities in cloud computing runtime environments for application detection and response.

BACKGROUND

Open source software (OSS) is software whose source code is made freely available for anyone to view, modify, and distribute. This collaborative approach fosters innovation and allows users to customize the software to meet their specific needs while benefiting from community support and contributions. The OSS is highly customizable in that developers (or users) can easily modify the source code to fit their specific needs, which allows for tailored solutions that might not be possible with closed-source software. Moreover, OSS often adheres to open standards thereby allowing greater freedom in choosing complementary tools and technologies. That is, the OSS is highly accessible and versatile without the added financial constraint. To this end, OSS is widely utilized, where some report that more than 80% of applications today adopt OSS components, libraries, and frameworks in their application development.

However, it has been identified that the OSS's cost efficiency and availability also raises several cybersecurity challenges. One significant issue is the potential for vulnerabilities in the code that may go unnoticed due to the varied levels of scrutiny across different projects. While many OSS projects benefit from community contributions and peer reviews, not all receive the same level of attention, leading to some vulnerabilities remaining unpatched for extended periods. Another concern is the risk of malicious code being inserted into the software. Since OSS allows anyone to contribute, there is a possibility of introducing backdoors or other security flaws, especially if contributors to the OSS projects are not thoroughly vetted. This can be particularly problematic in widely used libraries, where a single compromised component can affect many applications. Moreover, OSS projects rely on numerous external libraries, and vulnerabilities at any of these dependencies, that can expose the entire application and library-sharing applications to risk. Such factors, in combination, highlight the need for careful management and auditing when utilizing OSS in any system.

It has been identified that applications are increasingly becoming targets of threat and exploitation. However, modern applications are often complex, for example, employing cloud-computing or other architectures that hinder visibility and monitoring of the application layer for vulnerabilities. The combined escalation of complexity and targeting of applications demand effective application detection and response (ADR) approaches.

Some current solutions to identify vulnerabilities and/or exploits in OSS include automated tools like static analysis and dependency scanning, which analyze code and libraries for known security issues, in combination with vulnerability databases. Such solutions have been identified to often produce false positives or false negatives, which can lead to either unnecessary alerts or overlooked vulnerabilities. Moreover, incomplete information and the sheer volume of vulnerabilities across OSS libraries and applications create challenges.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for efficiently detecting an exploitation during a workload runtime. The method comprises: fetching a library call chain that has at least a first library, wherein the library call chain is a series of software libraries that are employed in executing the workload at the runtime, wherein the library call chain is fetched based on a trigger of an event at the workload runtime; determining a hash value for the fetched library call chain, wherein the hash value is a numerical representation of the library call chain that has at least the first library; checking the determined hash value against a policy for a match; detecting an exploit in the library call chain upon determining a mismatch between the determined hash value and the policy; and causing an execution of a mitigation action.

Certain embodiments disclosed herein also include a non-transitory computer readable medium having stored thereon causing a processing circuitry to execute a process, the process comprising: fetching a library call chain that has at least a first library, wherein the library call chain is a series of software libraries that are employed in executing the workload at the runtime, wherein the library call chain is fetched based on a trigger of an event at the workload runtime; determining a hash value for the fetched library call chain, wherein the hash value is a numerical representation of the library call chain that has at least the first library; checking the determined hash value against a policy for a match; detecting an exploit in the library call chain upon determining a mismatch between the determined hash value and the policy; and causing an execution of a mitigation action.

Certain embodiments disclosed herein also include a system for efficiently detecting an exploitation during a workload runtime. The system comprises: a processing circuitry; and a memory, the memory containing instructions that, when executed by the processing circuitry, configure the system to: fetch a library call chain that has at least a first library, wherein the library call chain is a series of software libraries that are employed in executing the workload at the runtime, wherein the library call chain is fetched based on a trigger of an event at the workload runtime; determine a hash value for the fetched library call chain, wherein the hash value is a numerical representation of the library call chain that has at least the first library; check the determined hash value against a policy for a match; detect an exploit in the library call chain upon determining a mismatch between the determined hash value and the policy; and cause an execution of a mitigation action.

Certain embodiments disclosed herein include the method, non-transitory computer readable medium, or system noted above, further including or being configured to perform the following steps: receiving the trigger by the event, wherein the trigger has at least a first function that invokes the event in the workload runtime, wherein the first library has the first function.

Certain embodiments disclosed herein include the method, non-transitory computer readable medium, or system noted above, wherein the trigger has an unwound call stack starting from the first function.

Certain embodiments disclosed herein include the method, non-transitory computer readable medium, or system noted above, wherein the library call chain represents a sequence of functions in the unwound call stack.

Certain embodiments disclosed herein include the method, non-transitory computer readable medium, or system noted above, wherein the policy has a data structure listing allowed hash values for the workload, wherein the allowed hash values are learned during peacetime.

Certain embodiments disclosed herein include the method, non-transitory computer readable medium, or system noted above, wherein the policy is unique to any one of: a customer, an application, a service, a microservice, and a container.

Certain embodiments disclosed herein include the method, non-transitory computer readable medium, or system noted above, further including or being configured to perform the following steps: applying a stream hash function to the fetched library call chain, wherein the determined hash value accounts for a sequence of the software libraries in the library call chain.

Certain embodiments disclosed herein include the method, non-transitory computer readable medium, or system noted above, wherein the event at the workload runtime requests interaction with a kernel.

Certain embodiments disclosed herein include the method, non-transitory computer readable medium, or system noted above, further including or being configured to perform the following steps: iteratively repeating the steps of determining the hash value and checking the determined hash value, upon identifying a next library in the library call chain, wherein the next library is incrementally added to the library call chain to determine an updated hash value.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments provide a system and method for detecting vulnerabilities and/or exploits in a runtime environment based on at least one library call chain. More particularly, the embodiments disclosed herein provide a method to detect an exploit of vulnerabilities in software libraries employed in execution of the workload in real-time. One or more software libraries may be employed for execution of an event in the workload (e.g., task, application, service, or the like) and a consecutive library call chain that lists the software libraries are utilized. The library call chain is a sequence of software libraries that represent a sequence of function calls that invokes a trigger event of the workload. At least a portion of the library call chain is identified and utilized to determine a violation in the library call chain and thus, an exploit in at least one library in the library call chain and the executing workload.

The embodiments disclosed herein provide an accurate and reliable detection using library call chains that avoids extensive searching of the vulnerability database. The exploits are detected and declared based on the software libraries rather than the functions themselves. It has been identified that functions of a workload may be readily modified to be, for example and without limitation, renamed, relocated, or the like with optimization and development. Rather than utilizing such function calls, the embodiments disclosed herein employ the libraries and/or the library call chain, instead of functions, to provide stable and reliable monitoring and detection of exploits at runtime. That is, the relationship or path of libraries is learned for a call stack and is implemented for accurate assessment of the system call. It should be further noted that consecutive functions of the same library may be recognized as a single library, thereby reducing the amount of stored and retrieved data. As an example, a single library may be searched for three consecutively called functions from the same library that would otherwise be separately searched and tested for.

Moreover, the embodiments disclosed herein employ stream hashes for the library call chain and its portion that are determined during the learning phase and the operation phase. The stream hashes for at least a portion of the library call chain are calculated and compared to that of the normal baseline behavior established during the learning phase for accurate and efficient detection of violation or deviation in the runtime environment. The stream-based hashing is determined from a continuous stream of library data that is retrieved from the library call chain and/or the unwinding of the call stack. Particularly, the hash values are incrementally updated based on the added library for rapid and computationally efficient processes. In an embodiment, a stream hash function is efficient and resistant to collision, thereby providing unique hash values for learning and analysis of exploits. It should be noted that such rapid detection of exploits may allow immediate triggering of a mitigation action on exploits in the computing component and resources.

According to the disclosed embodiments, the exploit is detected at real-time without modification and added complexity to the resources, system, and the infrastructure. An agent is deployed at the resource to passively monitor the invocation of events by the function calls. That is, the real-time detection, as disclosed herein, is readily configurable and compatible with cloud environment and resources without burden on the cloud environment and infrastructure.

It has been identified that visibility of threats into the application layer is unavailable, which can be particularly critical for zero-day vulnerabilities. Such vulnerabilities impose high risks not only due to unknown mitigation techniques, but also due to inability to detect such threats at the application level. The embodiments disclosed herein specifically target security concerns and activities at runtime to detect exploits from libraries that are actually executed. These zero-day vulnerabilities are tackled by effectively detecting exploits without prior knowledge of the vulnerabilities.

It has been identified that more than 90% of software libraries deployed are not executed during runtime. The disclosed embodiments herein focus the security analysis on a smaller portion of executed libraries within a workload to reduce computational burden and improve detection efficiency. Moreover, such analysis of runtime allows prioritized detection and mitigation of exploits that are actively implementing malicious activity and have higher potential to cause a security breach. It should be noted that an increasing number of attacks are targeted at applications and thus, effective detection and mitigation of exploits on these workloads would improve cybersecurity protection at various cloud computing resources.

Figure 1:
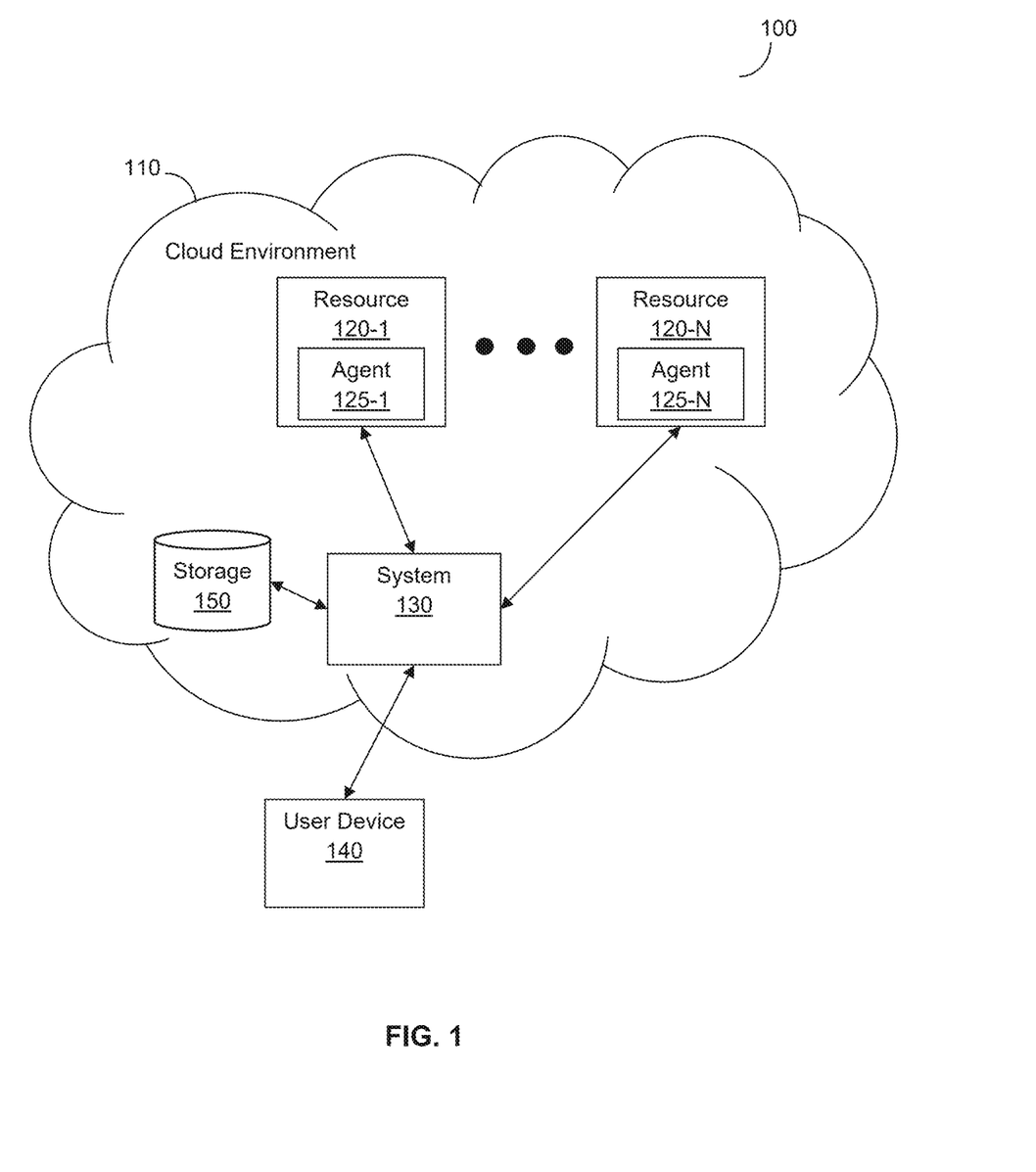
FIG. 1 is a network diagram utilized to describe various disclosed embodiments.

FIG. 1 shows an example cloud diagram 100 utilized to describe the various disclosed embodiments. In the example cloud diagram 100, a plurality of cloud resources 120-1 through 120-N (hereinafter referred to individually as a resource 120 and collectively as resources 120, merely for simplicity purposes), a plurality of agents 125-1 through 125-N (hereinafter referred to individually as an agent 125 and collectively as agents 125, merely for simplicity purposes), a system 130, and a storage 150 communicates within a cloud environment 110. Moreover, the example cloud diagram 100 includes a user device 140 that communicates with the system 130 over a network.

The network may include, but is not limited to, a wireless, cellular or wired network, a local area network (LAN), a wide area network (WAN), a metro area network (MAN), the Internet, the worldwide web (WWW), similar networks, and any combination thereof. In some embodiments, the system 130 may be installed outside of the cloud environment 110 and communicated via the network.

The cloud environment 110 may be, but is not limited to, a public cloud, a private cloud, or a hybrid cloud. A public cloud is owned and operated by a third-party service provider that delivers computing resources for use over the internet, whereas a private cloud is cloud computing resources that are exclusively used by a single business or an organization. A hybrid cloud combines the public cloud and the private cloud that allows data and application sharing between both types of computing resources. Some examples of a cloud environment 110 may include, and without limitation, Amazon® Web Services (AWS), Microsoft® Azure, Google® Cloud Platform (GCP), and the like, which offer shared infrastructure managed by the cloud providers, providing scalability, flexibility, and reduced infrastructure management.

The user device (UD) 140 may be, but is not limited to, a personal computer, a laptop, a tablet computer, a smartphone, a wearable computing device, or any other device capable of receiving and displaying notifications. The user device 140 may receive, for example, a report, an alert, or the like, of identified OSS libraries, vulnerability information, detected exploit, violation from normal library call behaviors, and the like generated at the system 130. In an example embodiment, the notification may be displayed via graphical user interface (GUI) such as, but not limited to, a dashboard. The report describes, for example, but not limited to, library information (e.g., library name, library version, etc.), sequence of libraries, the trigger event, call stack information, function information, detected exploit, the mapped key, risk level, and the like, and any combination thereof that are collected with respect to the trigger event at the cloud resource 120. The trigger event may be predetermined by a user via the user device 140. In an embodiment, the trigger event may be a system call from a list of predefined events.

The cloud resources 120 are virtual components or capabilities that are provided by the cloud environment 110 to perform workloads (e.g., tasks, applications, services, functions, and the like, and any combination thereof). The resources 120 may be rapidly provisioned and released with minimal management effect and are accessible over the internet. The cloud resource 120 may be deployed with software libraries including, but not limited to, open source software (OSS) libraries that are utilized in the various workloads (e.g., applications, services, etc.). Hereinafter, software libraries are referred to as libraries for simplicity and without limitation. The libraries or portions thereof (e.g., the function) may be processed in the runtime environment at instances. The libraries in the resources 120 may include undiscovered vulnerabilities that originate from, for example, the OSS library, placing the resource 120 at risk of exploitation. It should be noted that to ensure security at the cloud resource 120 and the cloud environment 110 as a whole, identification and mitigation of vulnerabilities or exploits are desired.

Each of the cloud resources 120 is configured with an agent 125 to monitor the workload at an instance of the resource 120. The agent 125 may be realized as a piece of code stored in a memory and executed over a process of the cloud resource 120. The agent 125 is further configured to scan or monitor any deployed codes relevant to the respective resource 120 at for example, but not limited to, predetermined intervals, on-demand, and the like. The agent 125 may be deployed on a virtual machine (VM) host, a container host, the host's kernal, the container runtime, and the like, and any combination thereof in order to monitor the resource 120. Some examples of the instance of the resource 120 may include, without limitation, a virtual machine instance, a container instance, and the like instance of other cloud infrastructure components. Such agent 125 may operate in a user mode, a kernel mode, or both.

The agent 125 is configured to monitor workloads, codes, and the like, executed at runtime to collect and relay execution data to the system 130. The agent 125 may run in a production environment of the application or the service, during actual operation, for live monitoring of the compute resource 120. In an embodiment, the agent 125 is configured to retrieve the function when triggered by an event such as, but not limited to, invocation of a system call. In a further embodiment, the agent 125 may be attached to hooks of predefined events. In an embodiment, the agent 125 collects, for example, but not limited to, a first function call, a call stack of the function, and the like, and any combination thereof associated with the triggered event and provides to the system 130. In an embodiment, the call stack of the function may be unwound at the agent 125. In some embodiments, an identifier (e.g., a symbol in the code, or the like) of the first function call is retrieved and relayed to identify the source library for the first function.

In an embodiment, the agent 125 may separately monitor the one or more computing components (e.g., a processor, a virtual machine, a software container, an instance, or the like) of the resource 120 for segregated assessment of exploitation against respective runtime policies. The computing components with different applications, microservices, services, or the like would have different legitimate sequence of functions and libraries depending on the normal workload operation.

The agent 125 can be realized in software, firmware, middleware, hardware, or combination thereof. Software shall be construed broadly to mean any type of instructions, whether referred to as software, firmware, middleware, microcode, hardware description language, or otherwise. Instructions may include code (e.g., in source code format, binary code format, executable code format, or any other suitable format of code).

The system 130 is a component, a software, a server, a system, a device, and the like, in the cloud environment 110 that monitors and detects exploitation of vulnerabilities in, for example, but not limited to, a service, an application, a service, a microservice, a container, a pod, and the like, and any combination thereof, running in the cloud resource 120. Particularly, the system 130 is configured to analyze the live execution of workloads at the software library-level with respect to an event. In an embodiment, a library call chain that indicates a series of software libraries employed in the workload is defined as at least one hash value for matching against hash values of the legitimate workload in a policy. A mismatch of hash values between the workload and the policy indicates a violation of the policy and thus, an exploit in at least one library employed in the workload.

It should be noted that monitoring and assessment of exploits are performed on executed workloads and their libraries in real-time or near real-time. The assessment of executed libraries detects exploits in executed vulnerabilities to focus on detecting and mitigating actual threats for improved detection accuracy and protection while conserving computational resources in memory, energy, and cost.

The system 130 is configured to receive workload execution data from the agent 125 that is deployed at the resource 120 to monitor actual operations. The execution data received as a trigger from the initiation of the event may include, for example, but not limited to, one or more function calls, an unwound call stack, metadata, and the like, and any combination thereof. The event is a hook to trigger the collection of the executed functions by the agent 125. In an embodiment, the event may be a system call such as, but not limited to, file management, file operation, process control, memory management, network, signal handling, and the like. The metadata of the trigger may be, for example, but not limited to, a resource identifier (ID), an application (or service, container, etc.) ID, customer ID, and the like, and any combination thereof and utilized for retrieving the policy, executing the mitigation action, and more.

According to the disclosed embodiments, the system 130 is configured to determine hash values that represent the library call chain of the executed workload. The hash value is a numerical representation of an ordered sequence of at least a portion of the library call chain. The hash value is a unique value that accounts for and indicates the specific libraries, the connections, and the order of the at least a portion of the library call chain that it represents. In an embodiment, the hash values for executed workload and the policy of the workload during normal operation are compared to rapidly and accurately detect an exploit of vulnerabilities in the libraries. The detection via hash values is an efficient process enabling the real-time or near real-time mitigation of the exploit at the resource to prevent security breach.

In an embodiment, the system 130 may run in user mode, kernel mode, or both. In some embodiments, the system 130 may use an extended Berkeley Packet Filter (eBPF) to extend kernel behavior in a nonintrusive manner. In some other embodiments, the system 130 may run in the kernel space of, for example, but not limited to, a VM host, a container host, or the like. It should be noted that the process of the system 130 is sufficiently computationally efficient so that the process is capable of performing in the kernel space.

The storage 150 may be a memory, a database, a datastore, or any type of storage configuration in the cloud environment 110 and may be connected to the system 130 for data storage and retrieval. In some implementations, the storage 150 may be outside the cloud environment 110 and connected to the system 130 over the network. The storage 150 stores within a policy created based on normal baseline behavior of the workload such as, but not limited to, a service, a microservice, an application, a container, a pod, and the like. The policy is separately created, for example, per customer, per application, per service, per container, or the like. The policy includes at least one data structure listing the hash values of legitimate workloads. The policy may include a data structure for a list of allowed libraries and a data structure for a list of hash values. The storage 150 may include the normal baseline behavior information such as, but not limited to, call stacks, event calling functions, library call chain, and the like, and more which may not be part of the policy. In an embodiment, the policy, the data structures, or the like stored in the storage 150 is retrieved by the system 130 for analysis of the executed workload. The metadata of the trigger may be realized for retrieval.

It should be noted that the example arrangement of FIG. 1 is provided for illustrative purposes and does not limit the scope of the disclosed embodiments. The system 130 that is configured to detect an exploit in the executed library of an event may be located at the resource 120. The operation described with respect to system 130 may be performed at a system that is separate from the resource 120, a part of the resource 120, or both. It should be further noted that the agent 125 and/or the system 130 are integrated into the cloud infrastructure without modification of the resources 120 to avoid complexity in configuration and deployment.

In some implementations, the agent 125 and/or the system 130 may use an eBPF to be triggered by the request of the event in real-time. In some other implementations, the agent 125 and/or the system 130 are run in the kernel space in isolation and in a nonintrusive approach to further increase response and mitigation time with respect to exploits in executed workloads.

Figure 2:
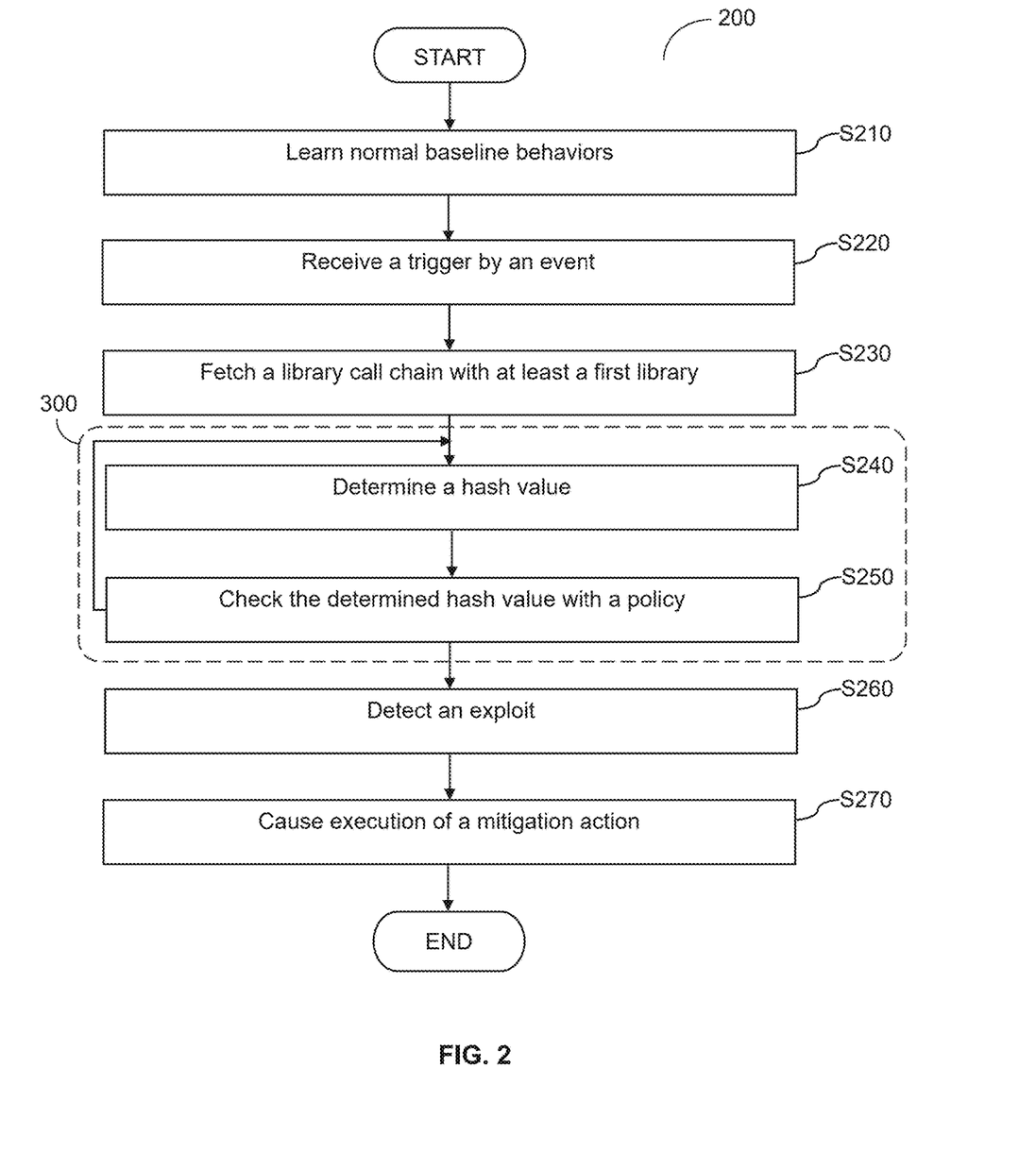
FIG. 2 is a flowchart illustrating a method for detecting an exploit at runtime according to an embodiment.

FIG. 2 is an example flowchart 200 illustrating a method for monitoring exploitations based on a library call chain according to an embodiment. The method described herein may be performed at the system 130, FIG. 1, which may be configured in or outside a cloud environment 110, FIG. 1. In some implementations, the system 130 is adapted as part of a resource 120, FIG. 1. It should be noted that the method is described with respect to a single occurrence of an event and a policy for the event for simplicity. However, the method may be performed for each occurrence of the event and simultaneously for multiple events without departing the scope of the disclosed embodiments.

At S210, normal baseline behaviors are learned for one or more events. The normal baseline behaviors are function and/or library calls performed during a peace time, when the resource is run incident-free, for example, without vulnerability detections or exploitations. That is, the normal baseline behaviors are sequences of calls that are executed during legitimate workloads. In an embodiment, the normal baseline behaviors are learned for one or more trigger events, which may be a system call requesting, for example, but not limited to, a memory allocation, a file manipulation, a process control, network call, and the like. In a further embodiment, the normal baseline behaviors may be learned, for example, but not limited, per application, per service, per customer, and the like, and any combination thereof.

A policy is generated based on the learned normal baseline behaviors to include an allowed list of, for example, but not limited to, libraries, sequences of calls (e.g., library calls, function calls, etc.), and the like, and any combination thereof with respect to one or more events. In an embodiment, the allowed sequence of libraries (i.e., a library call chain) for the event is hashed and represented as one or more hash values that each indicates the allowed library call chain. In a further embodiment, a stream hash is incrementally applied as each new library is added to the library call chain. That is, the hash value is calculated for each new library call to generate hash values for various segments as well as the whole library call chain.

The policy may include multiple hash values for a library rooted from the same trigger event to the library being called depending on different event occurrences. Here, the hash value for the library is unique to the associated library call chain and the event. As an example, a first library may be utilized in two different workloads that request a network call. In such a case, the first library is a member of two different library call chains that are represented as two different hash values.

In an embodiment, the policy may include the hash values and/or the libraries determined from the learned normal baseline behaviors as a simplified data structure rather than a hash map. The simplified data structure is relatively smaller in data size and the list of hash values and/or libraries allow rapid searching for matching hash values. In an embodiment, the policy is stored in a memory and/or a storage (e.g., the storage 150, FIG. 1). In some implementation, the policy may be generated to include a block list targeting known vulnerabilities and malicious behavior. The process of learning the normal baseline behavior and creating a policy is described in further detail below in FIG. 5.

In some implementations, the policy is created for a set of selected libraries which are identified as potentially vulnerable libraries. In an example embodiment, the set of selected libraries is determined based on, for example, but not limited to, national vulnerability database (NVD), Common Vulnerabilities and Exposure (CVE), OSS index, local vulnerability database, and the like. For example, the policy is generated for libraries with reported misuse. In an embodiment, the libraries may be selected by a user of the user device (e.g., the user device 140, FIG. 1). In another embodiment, the libraries may be selected based on a plurality of rules considering, for example, but not limited to, the application, the configuration, the customer, and the like, and any combination thereof.

In some implementations, the policy may include a shared list of allowed hash values that are determined from, for example, open source projects from various applications, customers, and more. In such a case, the policy still may include workload or customer specific rules to be applied in the monitoring of libraries and potential exploits.

At S220, a trigger by an event (or trigger event) is received upon detecting the event in an execution runtime. The trigger may be received in real-time or near real-time to initiate detection of potential exploits associated with the called event. Moreover, the analysis of the trigger verifies the legitimacy of the called event from one or more functions. In an embodiment, the trigger may include a function and/or series of functions that have called the event during runtime at a resource (e.g., the resource 120, FIG. 1). In another embodiment, the trigger may include an unwound call stack that is backtraced with respect to a first function that requests the event. In such a scenario, the first function is the last executed function that has called the event and occupies the topmost stack frame in the call stack. The trigger may include metadata such as, but not limited to, a resource identifier (ID), an application (or service, container, etc.) ID, customer ID, and the like, and any combination thereof that may be utilized to identify the source of the event and to accurately retrieve the relevant policy for analysis.

The event may be a system call such as, but not limited to, file management, file operation, process control, memory management, network, signal handling, and the like, and subordinate kernel functions originating from any system calls. In some embodiments, a trigger event may be a category encapsulating different system calls. For example, file open, file write, and file read system calls would be categorized into a single category of a "file operation" trigger event. It has been identified that system calls are targeted to exploit vulnerabilities in software and/or the operating system (OS), particularly due to its role as an interface between the user and kernel mode of the OS. Compromise of the system calls may allow access into sensitive files, network resources, or privileged changes at the kernel level that may be detrimental for applications, services, cloud components, and more. To this end, monitoring the system calls allows effective detection of potentially suspicious and/or malicious activity in order to reduce threats and prevent compromises of the software and/or the operation system.

In an embodiment, the execution of a predefined event in runtime is monitored and detected by an agent (e.g., the agent 125, FIG. 1) deployed at the resource. The agent is configured to collect relevant functions and relay them to the system (e.g., the system 130, FIG. 1) upon detecting the event in runtime. In a further embodiment, a predefined event is selected by a user (e.g., cloud consumer, cloud user, tenant, etc.) via a user device (e.g., the user device 140, FIG. 1). For example, the user may choose to monitor only file management, and thus, the predefined event includes the file management system calls. In an example embodiment, the predefined event is selected according to its security risk. In a further example embodiment, the predefined event may include at least one event that has higher security risk and/or impact on the OS. A hook is placed on the predefined event to act as a trigger point to collect and relay the trigger.

Such collection and relaying sessions via the agent are performed intermittently, periodically, or both according to, for example, the event detection, a predetermined time interval, and the like, and any combination thereof. It should be noted that such conditional activation, to collect and relay function call information, conserves computational resources at the resource 120, the agent 125, and the system 130 by reducing data collection, transmittance, and processing at the various computational components. In addition, monitoring the event as a trigger point enables analysis of executed workloads that are a higher threat and priority in protecting the system, rather than stored workloads and libraries that may not be a current threat. Such trigger point prioritizes actual functions and/or libraries that are executed over inactive ones, thereby improving efficiency and reducing noise in identifying exploits and vulnerabilities in the workload. In some implementations, a trigger may be received as the agent scans and/or runs deployed codes at the resource with respect to the predefined trigger event.

At S230, a library call chain that has at least a first library and is associated with the trigger event is fetched. In an embodiment, an entire library call chain of the trigger event is fetched. In another embodiment, a portion of the library call chain, for example, including the at least the first library, is fetched. The first library includes the first topmost (i.e., the last called) function that invoked the event. A library is collection of prewritten code, functions, or the like, and may be, for example and without limitation, an OSS library. In an embodiment, the first library is determined from the first (i.e., last called) function received with the trigger of the event. In another embodiment, the first library is determined from the first function occupying the topmost stack frame in the unwound call stack of the event. In yet another embodiment, the first library is fetched from a library call chain that is generated based on the unwound call stack of the trigger event.

The library call chain is a sequence of libraries utilized to invoke or request the event. The library call chain sequentially represents a series of function calls in the unwound call stack at a library-level. In an example embodiment, the library call chain lists libraries from a first library including the first function to a bottommost last library including a main function in which the workload starts the execution, i.e., reversed from the execution order.

The first library may be mapped to a plurality of immediate precursory functions of the topmost function. As an example, when a series of consecutive functions, up to the topmost function, originate from the first library, all functions of the series are mapped to the first library. That is, a single entry or value may be fetched and stored for one or more functions. It should be noted that such grouped mapping of consecutive functions of the same library reduces the number of entries to store, for conservation of memory and improved accuracy.

Some current approaches to determine the originating library from the received function include, for example, but not limited to, automatic scanning of function codes, checking function signatures, looking at header files, searching documentations or files in the code (e.g., manually, applying at least one algorithm, etc.), and the like, and any combination thereof. In some implementations, an identifier (or a symbol) of the function code may be used to map and identify the originating library.

A non-limiting example of identifying the library from function code is described in more detail in U.S. patent application Ser. No. 18/953,574 to Abitboul et al. assigned to the common assignee, the contents of which are hereby incorporated by reference. The non-limiting example method applies a sequential bit-by-bit matching of data structure keys and function code identifiers to identify the library for a function using partial information of the function code identifiers, thereby reducing the amount of processing and conserving computing resources. Some examples of function code identifier include, but are not limited to, class name, file path, file name, address range, and the like, any portion thereof, and any combination thereof.

At S240, a hash value for the first library is determined. In an embodiment, the hash value is determined by applying a stream hash to the first library that invoked the trigger event (e.g., the system call). As an example, the first hash value represents the first library making a system call. In another example, the first hash value represents a sequence of the top two libraries that invoked the trigger event.

The stream hash allows incremental hashing of portions of the library call chain to determine hash values for incremental extensions in the library call chain as described and utilized herein below. In an embodiment, the hash value represents at least a portion of the library call chain that is sequentially ordered from a point in the library call chain leading up to the first library in the library call chain. The hash value is a single numerical value unique to a portion of, or the whole, library call chain. It should be noted that the stream hash enables continuous determination of hash values at high efficiency, in real-time. It should be further noted that hashing via the stream hash improves computing efficiency, in at least memory and power, via the incremental determination capability that leverages previously determined hash values.

At S250, the determined hash value is checked with a policy. The policy has a set of rules for handling library call chains invoking the event in the associated runtime environment. In an embodiment, the policy has one or more data structures including hash values that represent allowed library call chains, in portions or whole, for one or more events that are monitored in the runtime environment. The allowed library call chains are legitimate library call chains with respect to the trigger events and are observed during the learning phase (S210). Such hash values may be searched and compared during the check to specify the following steps and to control execution of events. In an embodiment, the policy is retrieved from a memory and/or storage (e.g., the storage 150, FIG. 1). As noted above, a unique policy may be generated with respect to, for example, but not limited to, a customer (or consumer), a service, an application, a microservice, and the like, and any combination thereof from the normal baseline behavior learned during peace time. In an example embodiment, the policy may include parts of the normal baseline behaviors learned during peacetime according to user preferences.

According to the disclosed embodiments, the operation terminates upon determining a match between the determined hash value and an allowed hash value in the policy. Otherwise, the operation continues with S260 to declare a violation. The match indicates that the library call chain represented by the determined hash value is a legitimate and a normal behavior in association with the event received in S220. The data structures are searched using the determined hash value to determine the match.

It should be appreciated that the search and identification is performed efficiently and accurately by comparing numerical hash values that not only define the first library, but series of libraries leading up to the first library in the specified order. As an example, the first library has multiple associated hash values depending on the order, composition, and the length of the library call chain up to the first library. It should be further appreciated that such a search using a simplified data structure enables rapid and effective processing that may be performed at a kernel level in runtime. In addition, further analysis of other libraries (e.g., precedent libraries that had called the first library) may be avoided upon matching with the policy hash value, thereby removing unnecessary processing and conserving computational resources.

In some implementations, a notification and/or report may be generated to validate the respective library call chain as being legitimate. As an example, the validation may be added to a log and, further, may be provided for display on a user device (e.g., the user device 140, FIG. 1). In an embodiment, the operation 300 to validate the library call chain includes derivatives of S240 and S250.

In some embodiments, the operation returns to step S240 to determine a next hash value for an extended library call chain including a next library in the library call chain, followed by step S250 to check the determined next hash value against the policy. That is, the extended library call chain includes an additional library relative to the library call chain checked before returning to step S240. It should be noted that the extended library call chain refers to a library call chain including sequentially added libraries and is limited to the unwound call stack of the workload. That is, the extended library call chain cannot be longer than the length of the unwound call stack of the same workload executed to request the event.

The additional library in the library call chain is fetched from the library call chain. In an embodiment, the additional library, or the next library, in the library call chain may be determined by retrieving a second function that had called the first function. In some cases where a series of functions belong to the first library, retrieval of several functions may be performed in order to identify the next library (or the additional library). In another embodiment, the next library is fetched from the library call chain that is generated from the unwound call stack.

In an embodiment, the next library is processed by applying the stream hash for incremental hashing and updating of the hash value to determine the next hash value representing the extended library call chain. It should be noted that the hash values are progressively updated and replaced. Thus, saving the whole array of the library call chain at the same time is not essential. It should be further noted that the numerical hash value is a small data representation of a larger and more complex library call chain. One of ordinary skill in the art would understand the reduction in memory consumption enabled by the hash values.

The steps S240 and S250 may be repeated with incremental extensions of the library call chain, according to the policy, until the whole library call chain is resolved. A progressive validation of the library call chain may be performed within the validation process 300. At each repeated loop 300, a subsequent next hash value is determined for the incrementally extended library call chain, which may be stored in a memory and/or storage. As an example, three different hash values may be determined for the library call chain of the trigger event when the operation returns two times following the first hash value determination (S240) and policy check (S250). At any point during the returned looping steps, the operation may terminate according to the policy, for example, upon determining a match between the determined hash value (or next hash value) and the allowed hash value in the policy.

The steps of checking the determined hash value with the policy, including return loop operation 300, are described in further detail below in FIGS. 3 and 4. In one embodiment, the policy is a global policy that has rules on all allowed library call chains and portions thereof for all libraries observed during normal baseline behavior. The method of checking is described further in FIG. 3. In another embodiment, alternatively or collectively, the policy is a specific policy limited to selected libraries with, for example, but not limited to, known vulnerabilities, higher security risks, and the like, and any combination thereof. The specific policy has hash values for portions of the allowed library call chain that includes the selected libraries and excludes others. The selected libraries may be predetermined. The method of checking with the specific policy is further described in FIG. 4.

At S260, an exploit in the library call chain is detected based on the check with the policy. That is, an attack that leverages the vulnerability of at least one library in the library call chain is detected upon failing to determine the match of the determined hash value with the policy. The check with the policy may be based on the first determined hash value, or other subsequently determined next hash values for the library call chain of the event. In an embodiment, the violation of the policy suggests a potential vulnerability in the library call chain that invoked the event (S220). As an example, the exploit is detected when a portion of the library call chain includes an anomalous library that is not involved in making the system call as part of the normal baseline behavior observed during peacetime. In another example, the exploit is detected when the series of libraries in the library call chain are misarranged.

It should be noted that such declaration of violation and thus, exploit detection is rapidly and accurately determined using the hash values. Specifically, the numerical hash values are compared for a simple comparison of the library call chain of the event against the policy. In addition, the numerical hash values are determined based on libraries that each encompasses a group of functions rather than individual functions, thereby reducing the determination and comparison to be few and faster. In some embodiments, the method of monitoring runtime to detect exploitations may be performed in a kernel space and thus highly efficient.

At S270, a mitigation action is caused to be executed. The mitigation action is triggered against the sequence of libraries (or corresponding function calls) executed and identified to invoke the trigger event. The mitigation action may be, for example, but not limited to, generating a report and/or alert, presenting a report and/or alert via a user device, blocking execution of the event, at least a temporal block on the execution of a library or a function, modifying a return value to deny access, applying an access control, disabling features or services, triggering vulnerability scanning and/or testing, and more. As an example, the invocation and/or execution of the system call via the library call chain of the event may be suspended until security clearance. In another example, a protected entity (e.g., a service, an application, a microservice, a container, pods of at least one container, and the like) may be isolated from the rest of the environment.

In an embodiment, the mitigation action may be immediately performed upon detection of the exploit in order to block the event request from being executed. The real-time detection and mitigation prevent security compromise by canceling the event request as it is detected and before the actual execution. Such rapid detection, in addition to mitigation, is crucial for preventing breach and minimizing risk, that may otherwise not be effective using backend approaches that would respond with delay.

According to the disclosed embodiments, the library call chain (i.e., a sequence of libraries) is employed for reliable monitoring of potential vulnerabilities. The software libraries are more stable and consistent compared to functions that may be volatile in their names, storage locations, and the like. Moreover, the library call chains allow grouping of functions of the same library to reduce the amount of processing during analysis and tracking of the trigger event. The library call chain and its hash values are generated efficiently and also smaller in data size, compared to their counterpart function call stacks, in order to conserve storage space. The library identification and tracking avoid determining each specific function that is called to invoke the event. A group of serial function calls may be readily defined based on the identifiers or portions thereof.

It should be further noted that the disclosed embodiments allow passive detection of exploits without adding configuration complexity or burden on the resources. The function calls and/or library calls are monitored with invocation of the predefined events during runtime. Moreover, modification of resource codes and arrangements are avoided by employing an agent that intermittently collects and unwinds call stacks for analysis. Thus, the detection is not only efficient but also readily configurable and compatible with the cloud environment and the resources. In addition, it should be appreciated that the passive yet real-time monitoring is performed without adding security risks to the cloud environment and infrastructure by avoiding resource modifications.

Figure 3:
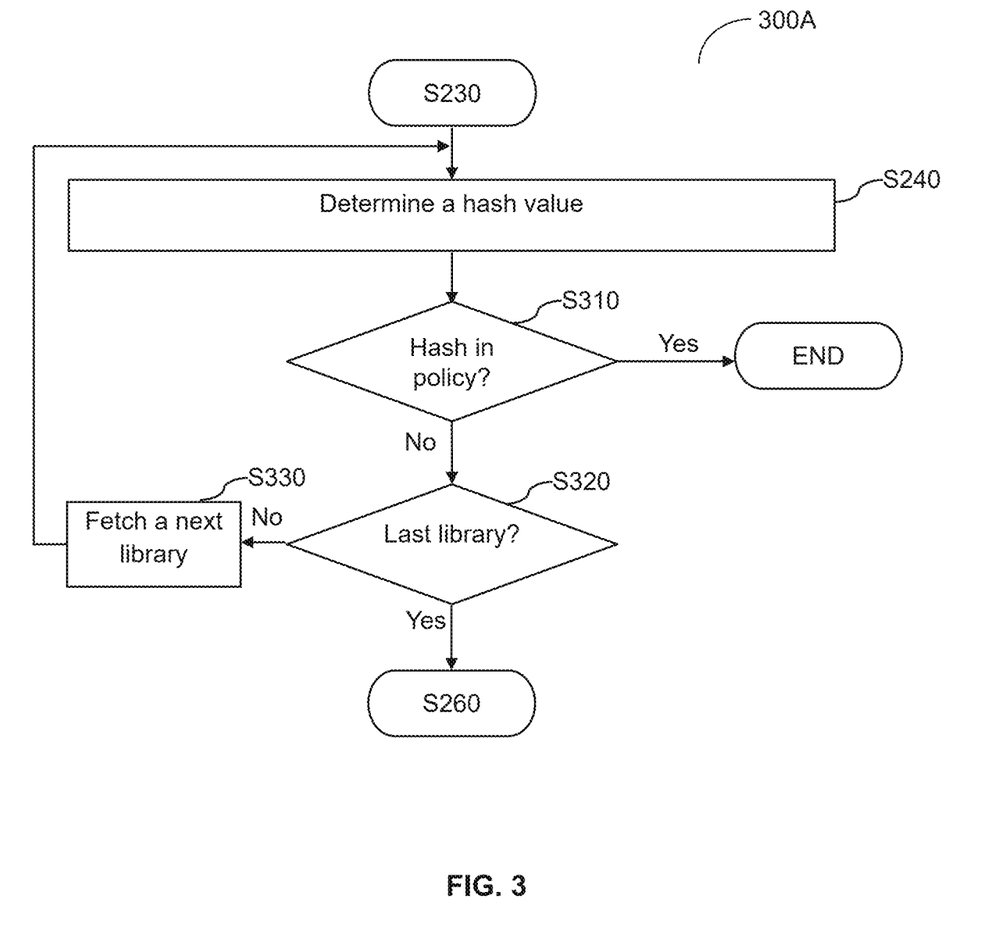
FIG. 3 is a flowchart illustrating a method for checking a library call chain with a first policy according to one embodiment.

FIG. 3 is an example flowchart 300A illustrating a method for checking a library call chain with a first policy according to one embodiment. The method further describes the process of progressively validating a library call chain 300 including the steps of determining hash values and checking the determined hash values noted in S240 through S250 of FIG. 2. The method is performed in the system 130, FIG. 1.

In an embodiment, the first policy is a global policy that utilizes data on all allowed library call chains and portions thereof for all libraries observed during normal baseline behavior. In a further embodiment, the hash values of the allowed library call chains are listed in a data structure and stored in a memory and/or storage 150, FIG. 1. It should be noted that the data structure of hash values is a simple list of hash values and is smaller in size compared to conventional hash maps. To this end, in an embodiment, at least portions of checking with the policy may be performed in a kernel of the OS.

At S240, a hash value is determined with respect to the first library in the library call chain of the event. As noted above, the hash value is determined by applying a stream hash on the first portion of the library call chain that includes the first library that is making the event call. The description above of S240, FIG. 2 applies herein, and the step is reproduced to describe determining of the hash value in relation to the checking method according to one embodiment.

At S310, it is checked whether the determined hash value is in the first policy. If so, the operation terminates; otherwise, the operation continues with S320. In an embodiment, the first policy is a global policy that utilizes all allowed library call chains for the event. A data structure with a list of hash values may be searched to find a match with the determined hash value. As noted above, the data structure and the policy may be generated based on the learning of normal baseline behavior (S210, FIG. 1).

At S320, it is checked whether the first library is a last library in the library call chain for the event. If so, the operation continues to S260; otherwise, the operation continues with S330. The last library in the library call chain is the library including the bottommost function (or main function) that was first called and executed in the corresponding call stack in calling the event. In an example embodiment, the bottommost function, sometimes referred to as the main function, may be the entry point of the workload.

At S330, a next library that precedes the first library in the library call chain is fetched. The next library is fetched based on the functions received with the trigger (S220). In an embodiment, the next library may be identified from the resolved whole library call chain. In another embodiment, the next library is identified by unwinding the next function that had called the earliest function in the first library. As an example, if the first library includes three functions A, B, and C that were called in this order, function C is the last called and topmost function and function A is the earliest called and bottommost function from the three functions. Thus, the next library is identified by unwinding the next function that had called function C.

The operation returns to S240 to determine a next hash value based on the extended library call chain including the first library and the next library. In an embodiment, the next hash value is determined by applying a stream hash based on the previously determined hash value of the first library. The check with the policy repeats with the determined next hash value. In an embodiment, the loop process to validate the library call chain based on hash values continues until the last library of the library call chain or when a matching hash value is identified in the policy at S310. For each iteration, the hash value is updated at S240 using the next library before checking with the policy in S310.

It should be noted that employing the first policy that includes hash values of all allowed library call chains often allow matching at an earlier stage within the library call chain. That is, the operation may terminate at the earlier point within the library call chain, thereby avoiding processing through the whole library call chain up to the last library (i.e., the first called library).

Figure 4:
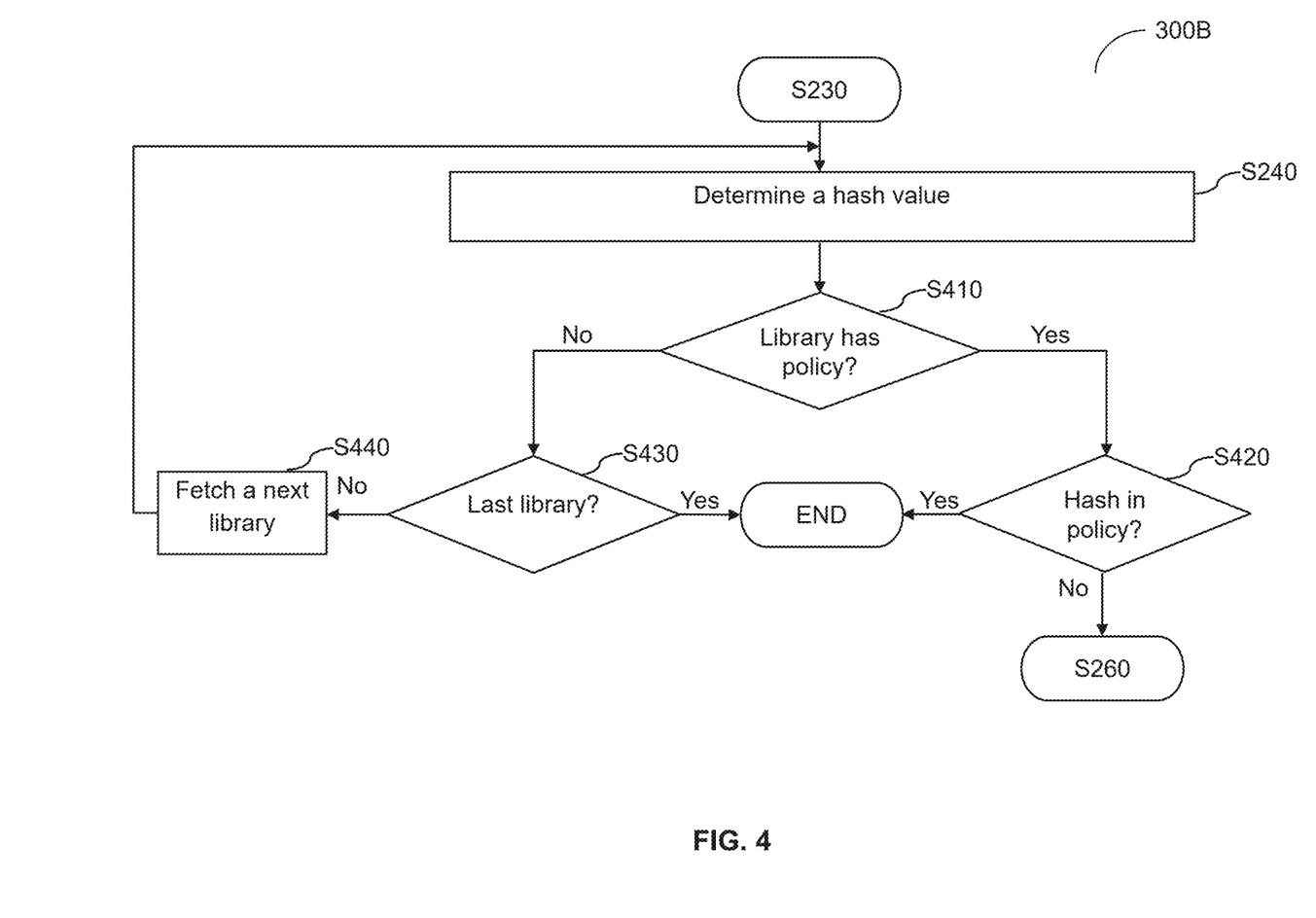
FIG. 4 is a flowchart illustrating a method for checking a library call chain with a second policy according to another embodiment.

FIG. 4 is an example flowchart 300B illustrating a method for checking a library call chain with a second policy according to another embodiment. The method further describes the process of progressively validating a library call chain 300 including the steps of determining hash values and checking the determined hash values noted in S240 through S250 of FIG. 2. The method is performed in the system 130, FIG. 1.

In an embodiment, the second policy is a specific policy that utilizes allowed library call chain data for selected libraries from all the libraries observed during normal base behavior. In a further embodiment, two types of data structures may be utilized, one listing the selected libraries and another listing the hash values of portions of the library chain that includes the selected libraries. The data structures may be stored and retrieved from a memory and/or storage 150, FIG. 1. In an example embodiment, the libraries for tracking and verifying are selected based on, for example, but not limited to, known vulnerabilities, higher security risks, or the like, of the libraries according to information in the security databases. It should be noted that the data structure of hash values a simple list of hash values that is smaller in size compared to conventional hash maps. To this end, the searching and matching of the hash values with the data structure may be rapidly performed while conserving computational energy, memory, and cost. In an embodiment, at least portions of the process of checking against the policy may be performed in a kernel of the OS.

At S240, a hash value is determined with respect to the first library in the library call chain of the event. As noted above, the hash value is determined by applying a stream hash on the first portion of the library call chain that includes the first library making the event call. The description of S240 in FIG. 2 applies herein, and the step is reproduced to describe determining of the hash value in relation to the checking method according to another embodiment.

At S410, it is checked whether a first library has a second policy. If so, the operation continues with S420; otherwise, the operation continues with S430. The second policy is a specific policy with a set of rules for selected libraries to be closely monitored. In an embodiment, the second policy may include rules on, for example, but not limited to, a first data structure with a list of selected libraries, a second data structure with a list of allowed hash values associated with the selected libraries, and the like. If the first library is not one of the selected libraries, there is not a second policy for the first library and the operation continues with S430. The selected libraries may be predetermined based on, for example, but not limited to, known vulnerability, high potential vulnerability, and the like, and any combination thereof. In an embodiment, the second policy may be predetermined, for example, but not limited to, per customer (or consumer), per application, per service, or the like.

At S420, it is checked whether the determined hash value is in the second policy. If so, the operation terminates; otherwise, the operation continues with S260 to detect an exploit. In an embodiment, the determined hash value is searched in the second data structure with the list of allowed hash values. The matching hash values indicates that the library call chain represented by the hash value is a legitimate call to invoke the event. A mismatch suggests a violation of the library call chain in making an event call and continues with S260. The violation may include, for example, but not limited to unexpected libraries being used, modified calling order, and the like, and any combination thereof.

In some embodiments, the second data structure may be null (i.e., empty dataset) without any allowed hash values associated with the first library (or next library) checked in S410. In such a scenario, any event trigger including the first library (or next library) would be considered a violation and the operation continues with S260.

At S430, it is checked whether the first library is a last library in the library call chain. If so, the operation terminates; otherwise, the operation continues with S440.

At S440, a next library in the library call chain is fetched. The next library is a precedent library that has called the first library in requesting the event (or system call) during execution at runtime. Since the library call chain is generated based on the backtraced unwound call chain, it is referred to as the next library.

The operation returns to S240 to determine a next hash value of the extended library call chain including the first library and the fetched next library. The next hash value is determined by applying a stream hash on the incremental extension of the library call chain by the next library and utilizing the first hash value. The operation continues using the determined next hash value to S410 and there onward based on the second policy. It should be noted that the next hash value is updated upon each return to S240 based on a progressive extension of the library call chain to add the next library that was used earlier than the previous library (S440). It should be further noted that the second policy that includes the selected list of libraries in the first data structure eliminates less vulnerable libraries efficiently to further reduce the amount of matching and checking processes of the determined hash values.

Figure 5:
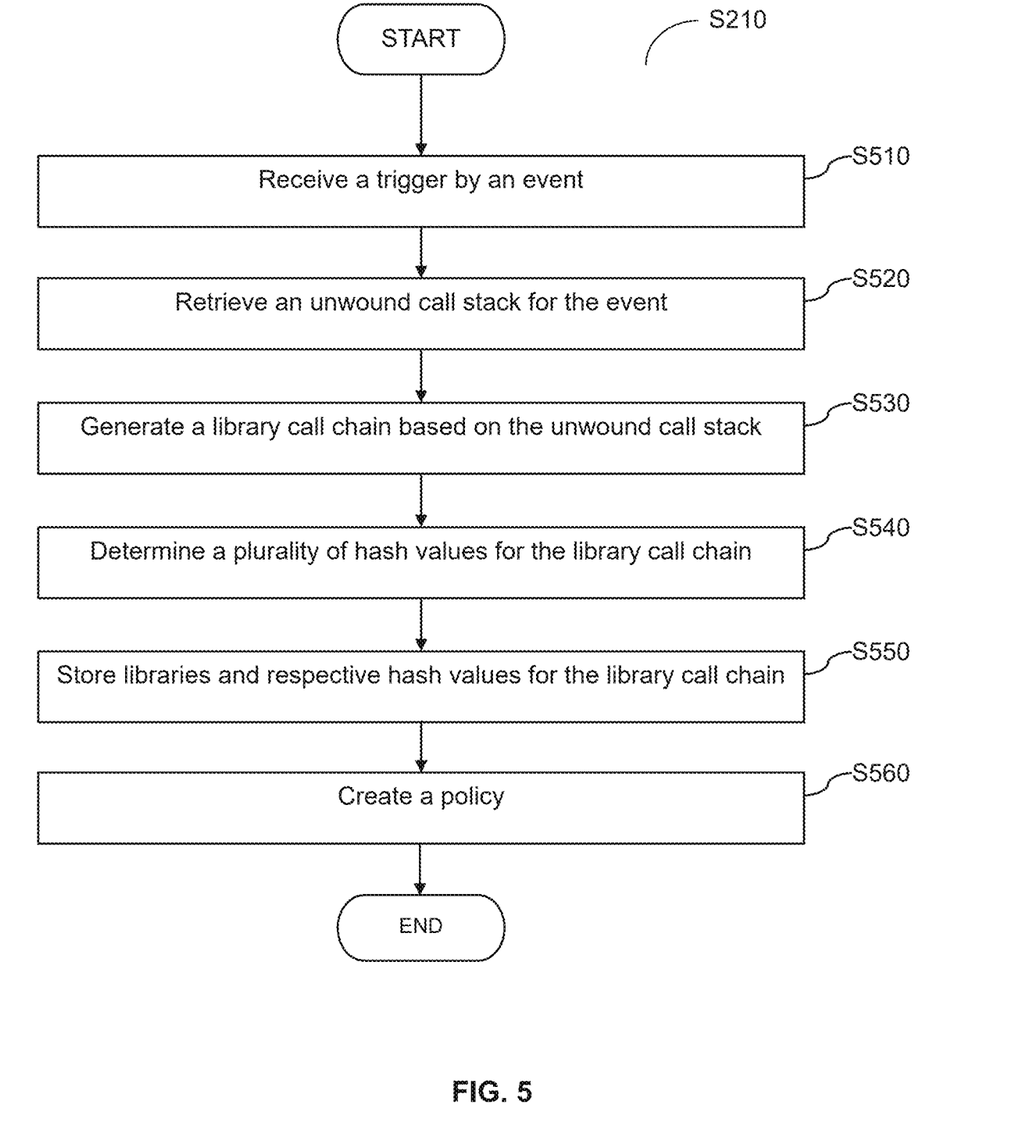
FIG. 5 is an example flowchart illustrating a method for learning the normal baseline behavior according to an embodiment.

FIG. 5 is an example flowchart S210 illustrating a method for learning the normal baseline behavior according to an embodiment. The method described herein may be performed at the system 130, FIG. 1 based on the data relayed by the agents 125, FIG. 1. The learning mode may be performed during peacetime when exploits are not detected during runtime at the resources 120, FIG. 1. It should be noted that the method is described with respect to a single event for simplicity and does not limit the scope of the disclosed embodiments. The operation may be performed for each event (e.g., all events, predefined events, etc.) that are initiated during normal execution of a workload (e.g., a task, an application, a microservice, a service, etc.) at runtime.

In an embodiment, the normal baseline behavior may include, for example, but not limited to, a series of functions, a call stack, a series of library calls, and the like that are executed during legitimate workloads. In a further embodiment, the normal baseline behavior is determined, for example, but not limited to, per service, per server, per application, or the like. In an embodiment, the learning phase may be performed for a predefined time period that is incident-free. In some embodiments, the normal baseline behavior and its analyses may be repeated and updated at a predefined refresh time interval, on-demand, or both.

At S510, a trigger by an event (or a trigger event) is received. The trigger may include a function and/or series of functions that have called the event at runtime. The trigger is received when the event such as, but not limited to, a system call, or the like, is initiated at the runtime of the resource (e.g., the resource 120, FIG. 1).

In an embodiment, the trigger event may be a request for higher privilege operations from OS kernel. Some examples of the event are, without limitation, file management, file operation, process control, memory management, network, signal handling, and the like, as well as subordinate kernel functions originating from any system calls. In an embodiment, the event may be predefined for tracking. In a further embodiment, the predefined events are hooked to initiate the collection and relay of function call by the agent (e.g., the agent 125, FIG. 1) at the resource (e.g., the resource 120, FIG. 1). The predefined events for the learning phase may be the same or different from the predefined events that are monitored during the operation phase. In some cases, a hook may be placed on a greater number of events during learning phase compared to the operation phase to cover the wider breadth of events being called during peacetime. It should be noted that the agents are deployed at the resource to run in the resource's production environment in order to track live execution of functions and events. It should be further noted that the agents are deployed without modification of the resource or the OS.

At S520, an unwound call stack for the triggered event is retrieved. The unwound call stack is a sequence of function calls that are executed in the workload and are backtraced with respect to the event initiation. The topmost stack frame in the unwound call stack has the first function that called the event and received as the trigger of the event. In an embodiment, the unwound call stack is received as part of the trigger and retrieved therefrom. In another embodiment, the unwound call stack may be generated through backward traversal from the first function received as the trigger.

At S530, a library call chain based on the unwound call stack is generated. The library call chain represents the series of frames in the unwound call stack as a corresponding sequence of software libraries. The originating library for each function in the call stack is identified and consecutively listed to mirror the order of stack frames in the unwound call stack. Moreover, the library call chain groups consecutive functions from the same library as a single entry in the library call chain in order to reduce the number of entries or data points in the library call chain relative to its call stack counterpart. It should be noted that the library call chain determined herein represents a legitimate sequence of libraries being called and executed to initiate the event.

In an embodiment, the library of a function call may be identified based on an identifier (e.g., a symbol) of the function or function code. A non-limiting example of identifying the library of the function is described in more detail in U.S. patent application Ser. No. 18/953,574 to Abitboul et al. assigned to the common assignee, the contents of which are hereby incorporated by reference. In another embodiment, the library of the function code may be identified by scanning the function code documents and comparing with a data structure. Other methods to generate the library call chain from the unwound call stack may be utilized without departing from the scope of the disclosed embodiments.

At S540, a plurality of hash values is determined for the library call chain. The hash values are determined for increments of the library call chain from the last-called, topmost, first library that includes the first function. In an embodiment, the hash values are determined based on a stream hashing process starting with an initial hash value (e.g., an empty state or a predefined first library value). Additional hash values are calculated as libraries that proceed the first libraries are sequentially added and processed together. In an example embodiment, a hash value is determined for the first library as well as for each incremental addition of a library until the entire library call chain is processed.

It has been identified that a stream hash approach is memory-efficient in that the entire library call chain is not held in memory at once during processing. It should be noted that the stream hashing process leverage precedent hash values rather than re-processing for each addition for rapid and efficient processing. The hash value is a numerical representation of at least a portion of the library call chain.

At S550, the libraries and the plurality of hash values are stored. The libraries identified for the event, as part of the library call chain, as well as the plurality of hash values determined by the library call chain are stored in a storage (e.g., the storage 150, FIG. 1). The storage may be any type of storage configuration that allows storing and access of data. It should be noted that the library call chain, libraries, and the hash values determined from the normal baseline behavior during the learning phase are legitimate calls for executing the workload and thus, are identified as allowed within the analyzed system, service, application, and the like.

At S560, a policy is created by aggregating the libraries and associated plurality of hash values that are determined from the normal baseline behavior. The policy includes an allowed list of, for example, but not limited to, libraries, sequence of calls, the plurality of hash values, and the like, and any combination thereof with respect to one or more events. The libraries and the plurality of hash values determined for the trigger event is added to the policy as the event is triggered and analyzed. The policy may include multiple hash values for the first library initiating the same trigger event. In such a scenario, the different hash values may indicate separate event occurrences that are initiated by the first function but have different library call chains. In an embodiment, the policy is continuously created over the learning phase to aggregate the libraries and the plurality of hash values identified from the normal baseline behavior. In some embodiments, the policy may include selected libraries and hash values that are executed above a predetermined threshold rate or number.

In an embodiment, the policy may include the allowed libraries and the corresponding plurality of hash values from the normal baseline behavior in a data structure. In another embodiment, the policy may include a first data structure with a list of libraries and a second data structure storing a list of legitimate hash values. In some embodiments, the policy may include portions of the stored libraries and the plurality of hash values which are selected based on, for example, but not limited to, risk factors, vulnerabilities databases, cybersecurity threat knowledge, and the like, and any combination thereof.

The policy may be stored in a memory and/or a storage (e.g., the storage 150, FIG. 1). It should be noted that the policy of legitimate, and thus allowed, hash values is stored as a simple data structure rather than larger hash maps, which would be generated for each library. To this end, the policy created according to the disclosed embodiments is stored on reduced memory and/or storage spaces.

In some embodiments, the policy and its data structure may be stored in an OS kernel space associated with the resource (e.g., the resource 120, FIG. 1). In such a scenario, the created policy is readily available for accessing runtime exploitations within the kernel. It should be appreciated that such availability in the OS kernel space is allowed by a compact size of the data structure.

Figure 6:
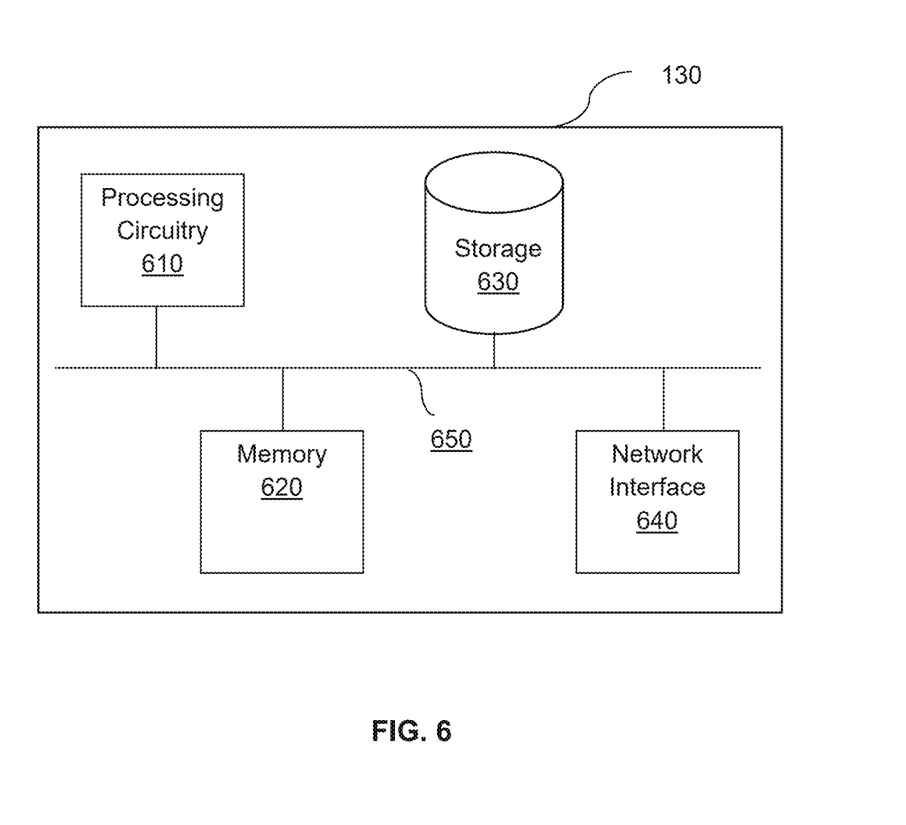
FIG. 6 is a schematic diagram of a system according to an embodiment.

FIG. 6 is an example schematic diagram of a system 130 according to an embodiment. The system 130 includes a processing circuitry 610 coupled to a memory 620, a storage 630, and a network interface 640. In an embodiment, the components of the system 130 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the system 130 to communicate with, for example, the resources 120, the agents 125, the user device 140, the storage 150, and the like.

It should be understood that the embodiments described herein are not limited to the specific architecture illustrated in FIG. 6, and other architectures may be equally used without departing from the scope of the disclosed embodiments.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for efficiently detecting an exploitation during a workload runtime, comprising:
   fetching a library call chain that has at least a first library, wherein the library call chain is a series of software libraries that are employed in executing the workload at the runtime, wherein the library call chain is fetched based on a trigger of an event at the workload runtime;
   determining a hash value for the fetched library call chain, wherein the hash value is a numerical representation of the library call chain that has at least the first library, wherein the hash value is unique to the series of software libraries and their order in the library call chain;
   checking the determined hash value against a policy for a match;
   detecting an exploit in the library call chain upon determining a mismatch between the determined hash value and the policy; and
   causing an execution of a mitigation action.

2. The method of claim 1, further comprising:
   receiving the trigger by the event, wherein the trigger has at least a first function that invokes the event in the workload runtime, wherein the first library has the first function.

3. The method of claim 2, wherein the trigger has an unwound call stack starting from the first function.

4. The method of claim 3, wherein the library call chain represents a sequence of functions in the unwound call stack.

5. The method of claim 1, wherein the policy has a data structure listing allowed hash values for the workload, wherein the allowed hash values are learned during peacetime.

6. The method of claim 1, wherein the policy is unique to any one of: a customer, an application, a service, a microservice, and a container.

7. The method of claim 1, wherein determining the hash value further comprises:
   applying a stream hash function to the fetched library call chain, wherein the determined hash value accounts for a sequence of the software libraries in the library call chain.

8. The method of claim 1, wherein the event at the workload runtime requests interaction with a kernel.

9. The method of claim 1, further comprising:
   iteratively repeating the steps of determining the hash value and checking the determined hash value, upon identifying a next library in the library call chain, wherein the next library is incrementally added to the library call chain to determine an updated hash value.

10. A non-transitory computer readable medium having stored thereon instructions for causing a processing circuitry to execute a process, the process comprising:
    fetching a library call chain that has at least a first library, wherein the library call chain is a series of software libraries that are employed in executing a workload at a runtime, wherein the library call chain is fetched based on a trigger of an event at a workload runtime;
    determining a hash value for the fetched library call chain, wherein the hash value is a numerical representation of the library call chain that has at least the first library, wherein the hash value is unique to the series of software libraries and their order in the library call chain;

checking the determined hash value against a policy for a match;

detecting an exploit in the library call chain upon determining a mismatch between the determined hash value and the policy; and causing an execution of a mitigation action.

11. A system for efficiently detecting an exploitation during a workload runtime, comprising:

a processing circuitry; and a memory, the memory containing instructions that, when executed by the processing circuitry, configure the system to:

fetch a library call chain that has at least a first library, wherein the library call chain is a series of software libraries that are employed in executing the workload at the runtime, wherein the library call chain is fetched based on a trigger of an event at the workload runtime;

determine a hash value for the fetched library call chain, wherein the hash value is a numerical representation of the library call chain that has at least the first library, wherein the hash value is unique to the series of software libraries and their order in the library call chain;

check the determined hash value against a policy for a match;

detect an exploit in the library call chain upon determining a mismatch between the determined hash value and the policy; and cause an execution of a mitigation action.

12. The system of claim 11, wherein the system is further configured to:

receive the trigger by the event, wherein the trigger has at least a first function that invokes the event in the workload runtime, wherein the first library has the first function.

13. The system of claim 12, wherein the trigger has an unwound call stack starting from the first function.

14. The system of claim 13, wherein the library call chain represents a sequence of functions in the unwound call stack.

15. The system of claim 11, wherein the policy has a data structure listing allowed hash values for the workload, wherein the allowed hash values are learned during peacetime.

16. The system of claim 11, wherein the policy is unique to any one of: a customer, an application, a service, a microservice, and a container.

17. The system of claim 11, wherein the system is further configured to:

apply a stream hash function to the fetched library call chain, wherein the determined hash value accounts for a sequence of the software libraries in the library call chain.

18. The system of claim 11, wherein the event at the workload runtime requests interaction with a kernel.

19. The system of claim 11, wherein the system is further configured to:

iteratively repeat the steps to determine the hash value and check the determined hash value, upon identifying a next library in the library call chain, wherein the next library is incrementally added to the library call chain to determine an updated hash value.

* * * * *